(12) United States Patent
Olivieri

(10) Patent No.: US 10,215,835 B1
(45) Date of Patent: Feb. 26, 2019

(54) ESTIMATING LOCATION OF SOURCE OF SIGNAL OF INTEREST

(71) Applicant: Marc Pierre Olivieri, Mount Laurel, NJ (US)

(72) Inventor: Marc Pierre Olivieri, Mount Laurel, NJ (US)

(73) Assignee: L-3 Communications Services, Inc., New York, NY (US)

( * ) Notice: Subject to any disclaimer, the term of this patent is extended or adjusted under 35 U.S.C. 154(b) by 283 days.

(21) Appl. No.: 14/836,088

(22) Filed: Aug. 26, 2015

(51) Int. Cl.
*G01S 5/04* (2006.01)
*G01S 5/02* (2010.01)
*G01S 5/00* (2006.01)

(52) U.S. Cl.
CPC .............. *G01S 5/04* (2013.01); *G01S 5/0278* (2013.01)

(58) Field of Classification Search
CPC .......... G01S 5/04; G01S 5/0278; G01S 13/46; G01S 13/424; G01S 5/20; G01S 5/0289; G01S 13/003; G01S 3/28; G01S 3/023; G01S 13/726
See application file for complete search history.

(56) References Cited

U.S. PATENT DOCUMENTS

| | | | | |
|---|---|---|---|---|
| 3,184,739 A | * | 5/1965 | Franklin et al. | ........ G01S 13/46 |
| 4,751,511 A | * | 6/1988 | Komata et al. | ....... G01S 13/424 |
| 5,765,166 A | * | 6/1998 | Gotfried | ............... G01S 13/726 342/190 |
| 5,930,202 A | * | 7/1999 | Duckworth et al. | ...... G01S 5/20 |
| 5,959,580 A | * | 9/1999 | Maloney et al. | ......... G01S 5/04 |
| 6,670,920 B1 | * | 12/2003 | Herrick | ..................... G01S 5/04 |
| 7,092,726 B2 | * | 8/2006 | Shi et al. | .............. G01S 5/0289 |
| 7,518,543 B2 | * | 4/2009 | Herberthson | ......... G01S 13/003 |
| 8,150,567 B2 | * | 4/2012 | Frenkiel et al. | .......... G01S 3/28 |
| 8,674,880 B2 | * | 3/2014 | Lecca et al. | ............ G01S 3/023 |
| 2003/0069024 A1 | * | 4/2003 | Kennedy, Jr. | ......... H04W 64/00 |

FOREIGN PATENT DOCUMENTS

| | | | | |
|---|---|---|---|---|
| GB | 2196183 A | * | 4/1988 | ........... H01Q 1/1257 |
| WO | WO 2008/099390 A2 | * | 8/2008 | ............... G01S 5/04 |

* cited by examiner

*Primary Examiner* — Bernarr E Gregory
(74) *Attorney, Agent, or Firm* — Edward W. Callan

(57) ABSTRACT

A method of estimating the location of the source of a signal of interest (SOI), includes the steps of:
(a) sensing a plurality of directional samples of the SOI by using at least one signal receiving system at disparately located signal receiving locations;
(b) with at least one of the signal receiving systems, measuring the power variable of the received SOI; and
(c) processing the sensed directional samples of the SOI in combination with the power variable measurement of the SOI to estimate the location of the source of the SOI.

6 Claims, 1 Drawing Sheet

ESTIMATING LOCATION OF SOURCE OF SIGNAL OF INTEREST

BACKGROUND OF THE INVENTION

The invention generally pertains to telecommunications and is more specifically directed to estimating the location of the source of a signal of interest (SOI).

Known techniques for estimating the location of the source of a SOI are based upon processing a plurality of directional samples of the SOI that are sensed by a respective plurality of disparately located signal receiving systems.

SUMMARY OF THE INVENTION

The invention provides a method of estimating the location of the source of a signal of interest (SOI), comprising the steps of:

(a) sensing a plurality of directional samples of the SOI by using at least one signal receiving system at disparately located signal receiving locations;

(b) with at least one of the signal receiving systems, measuring the power variable of the received SOI; and (c) processing the sensed directional samples of the SOI in combination with the power variable measurement of the SOI to estimate the location of the source of the SOI.

By processing a power variable measurement of a SOI in combination with sensed directional samples of the SOI obtained by at least one signal receiving system at disparately located signal receiving locations in order to estimate the location of the source of the SOI, the invention enables more accurate estimations of the source of the SOI in various environments that cause an often unpredictable variety of multipath signal losses.

Additional features of the present invention are described with reference to the detailed description.

DETAILED DESCRIPTION

Figure 1:
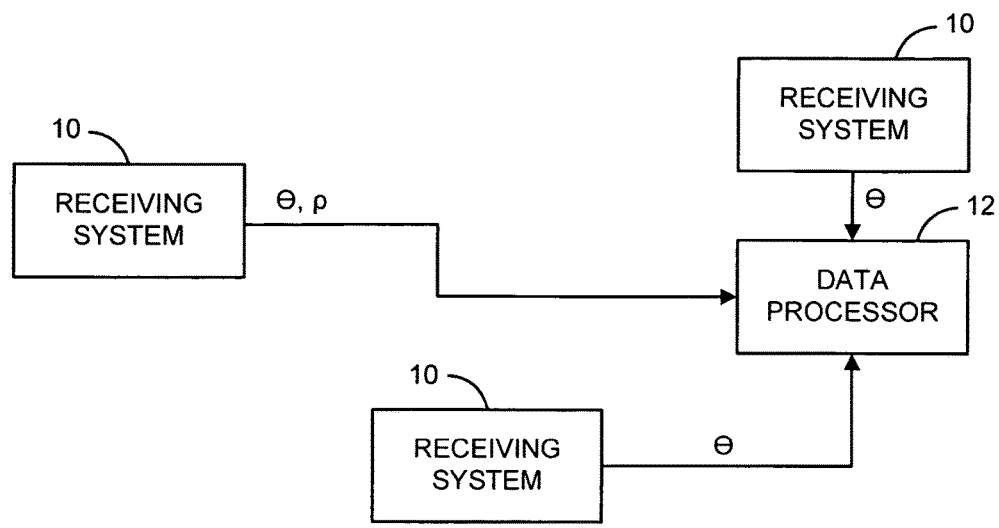
FIG. 1 is a block diagram showing an exemplary embodiment of apparatus for performing the method of the invention.

Referring to FIG. 1, an exemplary embodiment of apparatus for performing the method of the invention includes a plurality of receiving systems 10 at k disparately located signal receiving locations and a data processor 12. One of the receiving systems 10 may be airborne. In an alternative embodiment (not shown) a single receiving system receives signals at k disparately located signal receiving locations.

The data processor 12 preferably is located in common with one of the data receiving systems 10.

Each receiving system 10 includes an antenna, a telecommunications receiver, and a signal processor for providing directional data ($\theta$) samples of signals received by the antenna from the source of the SOI. The directional data ($\theta$) samples represent the line of bearing (LoB) of the respective receiving system 10 in relation to North from the kth receiving location to the source of the SOI.

At least one of the receiving systems 10 senses the amplitude of the signals received by the antenna from the source of the SOI; and the sensed amplitude of the received signals is processed by the signal processor to measure a power variable ($\sigma$) of the signals received from the source of the SOI.

The data processor 12 contains a computer and non-transitory computer readable storage media that includes computer executable program instructions for causing the computer to perform and/or enable various ones of the processing steps that are described herein. These instructions are stored in the non-transitory computer readable storage media of the computer when the computer is manufactured and/or upon being downloaded via the Internet or from a portable non-transitory computer readable storage media containing such instructions.

The data processor 12 processes the directional data ($\theta$) samples provided the plurality of receiving systems 10 in combination with the power variable ($\sigma$) measurements provided by at least one of the receiving systems 10 to estimate the location of the source of the SOI.

It is preferred that prior to such processing, the data processor 12 is used to precondition the sensed directional data ($\theta$) samples of the SOI and the measured power variables ($\sigma$) by organizing such directional data ($\theta$) samples and such measured power variables ($\sigma$) into spatial clusters. Such clustering is useful for removing outliers and focusing on trends for a measurement series. For directional data, a wide spread of series is indicative of a severe multipath of the received signals.

Clustering is important in urban areas for power estimation because the amplitude of the received signal follows a K-Rician distribution. Measuring the amplitude of a received SOI reveals a fading regime by estimating the K parameter in a K-Rician distribution and thereby enables an evaluation of the amount of loss-of-signal (LOS) energy versus multipath effects.

Figure 2:
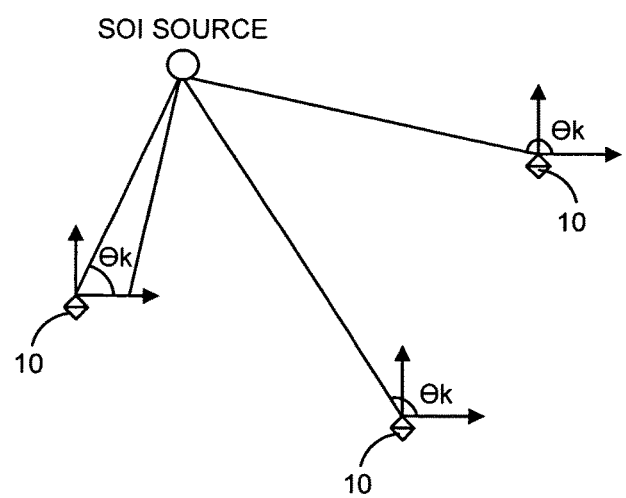
FIG. 2 illustrates exemplary locations of the receiving system(s) shown in FIG. 1 with respect to the sources of a SOI.

Referring to FIG. 2, which illustrates different exemplary receiving locations of the receiving systems 10, without regard to elevation, with respect to the source of the SOI, a two-dimensional estimation by the data processor 12 of the location of the source of the SOI is accomplished by assuming that:

i. the location of the source of the SOI is stationary and expressed as S=(x,y);

ii. the locations at which the directional samples are sensed are defined by a matrix Z with column k expressing the Zk receiving location for the receiving system as a pair ($Z_{kx}$, $Z_{ky}$);

iii. the line of bearing (LoB) in relation to North from the kth receiving location to the source of the SOI is expressed as $\theta_k$;

iv. the environment is such that there exists a signal-power ($P_K$) relationship between the location of the source of the SOI and the locations at which the directional samples are sensed, with said relationship being expressed by the following equation: $P_k = P_0 |Z_k - S|^{-\gamma}$, where Po is the power of the SOI and $\gamma$ is a signal-path-loss factor for said environment;

v. the location of the SOI with respect to the locations at which the directional samples are sensed is defined as a pair (xk, yk); and vi. rk is defined as the range from the sensor to the SOI; and wherein the power variable $\rho = (P_0)^{1/\gamma}$;

and by the data processor 12 performing the following steps:
and by the data processor 12 performing the following steps:

(a) preparing a system of equations:

A. $r_k^2 = x_k^2 + y_k^2$ (Eq. 1),

B. $P_k = P_0 |Z_k - S|^{-\gamma} = P_0 r_k^{-\gamma}$ (Eq. 2),

C. $\gamma_k = \tan(\theta_k) x_k$ (Eq. 3); and

D. $\vec{S} = \vec{Z_k} + \vec{r_k}$ (Eq. 4);

(b) using (Eq. 2) to express:

$$r_k^2 = \left(\frac{P_k}{P_0}\right)^{2/(-\gamma)};  \quad (Eq.\ 5)$$

(c) using (Eq. 5) to rewrite (Eq. 1) as:

$$x_k = \pm\left(\frac{P_k}{P_0}\right)^{1/(-\gamma)}(1+\tan(\theta_k)^2)^{-1/2} \quad (Eq.\ 6)$$

$$y_k = \pm\left(\frac{P_k}{P_0}\right)^{1/(-\gamma)}\left(1+\frac{1}{\tan(\theta_k)^2}\right)^{-1/2}; \quad (Eq.\ 7)$$

(d) using the angle of arrival (AoA) of each sensed directional sample to resolve the + ambiguity in (Eq. 6) and (Eq.7) by rewriting (Eq. 6) and (Eq.7) as:

$$x_k = \text{sign}(\cos(\theta_k))\left(\frac{P_k}{P_0}\right)^{1/(-\gamma)}(1+\tan(\theta_k)^2)^{-1/2}; \quad (Eq.\ 8)$$

$$y_k = \text{sign}(\sin(\theta_k))\left(\frac{P_k}{P_0}\right)^{1/(-\gamma)}\left(1+\frac{1}{\tan(\theta_k)^2}\right)^{-1/2}; \quad (Eq.\ 9)$$

(e) using (Eq. 4) to rewrite (Eq. 6) and (Eq.7) as:

$$1x + 0y - \text{sign}(\cos(\theta_k))(P_k)^{\frac{1}{-\gamma}}(1+\tan(\theta_k)^2)^{-\frac{1}{2}}\rho = z_{kx} \quad (Eq.\ 10)$$

$$0x + 1y - \text{sign}(\sin(\theta_k))(P_k)^{\frac{1}{-\gamma}}\left(1+\frac{1}{\tan(\theta_k)^2}\right)^{-1/2}\rho = z_{ky}; \quad (Eq.\ 11)$$

and (f) estimating the location (x, y) of the source of the SOI with respect to the vector position value (b) of the respective receiving location (K) by expressing (Eq. 10 and Eq. 11) as:

$$A\begin{pmatrix}x\\y\\\rho\end{pmatrix} = b,$$

where the matrix A's $2K^{th}$ and $(2K+1)^{th}$ rows are given by:

$$\begin{bmatrix}1 & 0 & -\text{sign}(\cos(\theta_k))(P_k)^{\frac{1}{-\gamma}}(1+\tan(\theta_k)^2)^{-\frac{1}{2}}\\ 0 & 1 & -\text{sign}(\sin(\theta_k))(P_k)^{\frac{1}{-\gamma}}\left(1+\frac{1}{\tan(\theta_k)^2}\right)^{-\frac{1}{2}}\end{bmatrix}, \quad (Eq.\ 12)$$

and b $kth$ and $(k+1)th$ values are $\begin{bmatrix}Z_{kx}\\Z_{ky}\end{bmatrix}$.

The data processor 12 further performs the step of:

(g) using the Moore Penrose pseudo inverse to a MMSE (minimum mean square error) solution of the vector position value (b) of the respective receiving locations (K) to solve for (x,y,p)

$$\begin{pmatrix}x\\y\\\rho\end{pmatrix} = (A^*A)^{-1}A^*b. \quad (Eq.\ 13)$$

The data processor 12 further performs the step of:

(h) computing and displaying a circle-error probability (CEP) of $$\begin{pmatrix}x\\y\\\rho\end{pmatrix} = (A^*A)^{-1}A^*b.$$

In an exemplary embodiment, the CEP computation is derived from a Gudrun Høye paper, "Analyses of the geo-location accuracy that can be obtained from shipborne sensors by use of time difference of arrival (TDOA), scan-phase, and angle of arrival (AOA) measurements".

The measurements for the power variable (σ) and the K AOA samples (θ) are regrouped in a vector V that depends on both the transmitter location S=(x,y), and the Kth receiving location, which is defined by a pair ($Z_{kx}$, $Z_{ky}$).

The parameters measured define V as:

$$V = \begin{pmatrix}\theta_1\\P_0|Z_1 - S|^{-\gamma}\\\vdots\\\theta_k\\P_0|Z_K - S|^{-\gamma}\end{pmatrix} = V(S, Z).$$

The partial derivative of the parameters with respect to the source of the SOI, define:

$$\frac{\partial \theta_k}{\partial x} = \frac{y - y_k}{(x - x_k)^2 + (y - y_k)^2}$$

$$\frac{\partial \theta_k}{\partial y} = \frac{x - x_k}{(x - x_k)^2 + (y - y_k)^2}$$

For power estimates express:

$$\frac{\partial P_k}{\partial x} = -\gamma P_0 \frac{x - x_k}{((x - x_k)^2 + (y - y_k)^2)^{(1+\gamma/2)}}$$

$$\frac{\partial P_k}{\partial y} = -\gamma P_0 \frac{y - y_k}{((x - x_k)^2 + (y - y_k)^2)^{(1+\gamma/2)}}.$$

The Matrix C is expressed as:

$$C = \begin{pmatrix}\frac{\partial \theta_1}{\partial x} & \frac{\partial P_1}{\partial x} & \cdots & \frac{\partial \theta_K}{\partial x} & \frac{\partial P_K}{\partial x}\\ \frac{\partial \theta_1}{\partial y} & \frac{\partial P_1}{\partial y} & \cdots & \frac{\partial \theta_K}{\partial y} & \frac{\partial P_K}{\partial y}\end{pmatrix}.$$

The K×K variance matrix D is expressed as:

$$\text{diag}(D) = (\sigma_{\theta_1}, \sigma_{P_2}, \ldots, \sigma_{\theta_K}, \sigma_{P_K}).$$

The CRLB Covariance Matrix K given by $$K=[CD^{-1}C^T]^{-1}.$$

Orientation and size of the semi major and semi-minor axes for the CEP ellipses can be obtained by the decomposition of K in its eigenvectors $V_n$ and eigenvalues $e_n$ that form the diagonal of the matrix E and forming the matrix $L=V\sqrt{E}$.

Orientation and size of the semi major and semi-minor axes for the CEP ellipses can be obtained by the decomposition of K in its eigenvectors $V_n$ and eigenvalues $e_n$ that form the diagonal of the matrix E and forming the matrix $L=V\sqrt{E}$.

Points on the error of position ellipse are given by pairs (qx,qy) points for angle beta that meet the relationship:

$$\begin{bmatrix} qx(\beta) \\ qy(\beta) \end{bmatrix} = L \begin{bmatrix} \cos(\beta) \\ \sin(\beta) \end{bmatrix}.$$

In the display, the ellipse is centered on the emitter location (x,y) estimated by with relationship in (Eq. 13).

A preferred Matlab Code for Equation 13 is as follows:
```
clear all
N=50; %# of measurements
gamma=-3.0; % gamma we are guessing
P0=pi; % Some nominal power
gammastd=0.25; % gamma deviations
pwrstd=1.5; % power deviations in dB
aoastd=5; % AoA deviations in std
range=1;
S=(randn(1,2))*range*1500+(1+i)*200;S=S(1)+i*S(2);   % set the source
Z=[1*randn(N,1)*0.01  1*randn(N,1)]*range*1000;Z=Z(:,1)+i*Z(:,2); % set the receiver locations
% Simulate and Compute noisy AoA
theta=angle(S-Z)*180/pi+randn(N,1)*aoastd
% Simulate and Compute imperfect power measurements
gammaset=gamma+randn*gammastd;
P=P0*abs(S-Z).^(gammaset).*(10.^(randn(N,1)*pwrstd/10));
% Define coefficients and matrices
Cx=sign(cos   d(theta)).*(P).^(1/gamma).*(1+tan   d(theta).^2).^(-1/2);
Cy=sign(sin  d(theta)).*(P).^(1/gamma).*(1+tan  d(theta).^-2).^(-1/2);
A=[reshape([ones(N,1)*[1 0]].',2*N,1) reshape([ones(N,1)*[0 1]].',2*N,1) -reshape([Cx Cy]',2*N,1)];
B=reshape([real(Z) imag(Z)]',2*N,1)
% compute Pinv for MMSE solution
sol=pinv(A)*B
pseudosol=sol(1)+i*sol(2);
[pseudosol S]
pp0=sol(3)^(-gamma) % Sanity Check
%%% All plots below
figure(10);
clf;
plot(Z,'bo');hold on;
axis('square')
axis('square');%[-1 1-1 1]*range*4);
figure(14);
hist(abs(ZZ2+Z-S),[0:10:2000]);
figure(10)
plot(ZZ2+Z,'k.')
plot(S,'rs','LineWidth',3);
axis('equal');
plot(pseudosol,'bs','LineWidth',3);plot([Z+0  Z+500*exp(i*theta/180*pi)].',' --');
title(['AOA std=' num2str(aoastd) '; PWR std=' num2str(pwrstd) '; Gamma std=' num2str(gammastd)]);
xlabel('m');ylabel('m');
legend('positions','estimates','S','Location Pointer Estimate','LOB from AoA')
```

In an alternative exemplary embodiment, in which the directional data samples (θ) provided the receiving systems 10 provided by the sensing systems include three-dimensional-parameter values of the directional data, the provided samples are processed by the data processor 12 in combination with the power variable (σ) measurements provided by at least one of the receiving systems 10 to estimate the location of the source of the SOI. The assumptions, mathematical expressions and equations applied as set forth above to estimate the location of the source of the SOI with regard to the two-dimensional embodiment discussed above with reference to FIG. 2 without regard to elevation also can be applied to estimate the location of the source of the SOI in the exemplary three-dimensional-parameter-value embodiment.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The invention claimed is:
1. A method of estimating the location of the source of a signal of interest (SOI), comprising the steps of:
 (a) sensing a plurality of directional samples of the SOI at disparately located signal receiving locations by using at least one signal receiving system;
 (b) with said at least one signal receiving system, measuring a power variable of the received SOI; and
 (c) processing the sensed directional samples of the SOI in combination with the power variable measurement of the SOI to estimate the location of the source of the SOI;
 assuming that:
   i. the location of the source, without regard to elevation, of the SOI is stationary and expressed as S=(x,y);
   ii. the locations at which the directional samples are sensed are defined by a matrix Z with column k expressing the kth receiving location as a pair ($Z_{kx}$, $Z_{ky}$);
   iii. the line of bearing (LoB) in relation to North from the kth receiving location to the source of the SOI is expressed as $\theta_k$;
   iv. the environment is such that there exists a signal-power ($P_K$) relationship between the location of the source of the SOI and the locations at which the directional samples are sensed, with said relationship being expressed by the following equation: $P_k = P_0|Z_k-S|^{-\gamma}$, where Po is the power of the SOI and $\gamma$ is a signal-path-loss factor for said environment;

v. the location of the SOI with respect to the locations at which the directional samples are sensed is defined as a pair (xk, yk); and vi. rk is defined as the range from the sensor to the SOI; and wherein the power variable $\rho = (P_0)^{1/\gamma}$;

step (c) comprises the steps of:

(d) preparing a system of equations:

A. $r_k^2 = x_k^2 + y_k^2$ (Eq. 1),

B. $P_k = P_0|Z_k - S|^{-\gamma} = P_0 r_k^{-\gamma}$ (Eq. 2),

C. $y_k = \tan(\theta_k) x_k$ (Eq. 3); and

D. $\vec{S} = \vec{Z_k} + \vec{r_k}$ (Eq. 4);

(e) using (Eq. 2) to express:

$$r_k^2 = \left(\frac{P_k}{P_0}\right)^{2/(-\gamma)};$$ (Eq. 5)

(f) using (Eq. 5) to rewrite (Eq. 1) as:

$$x_k = \pm\left(\frac{P_k}{P_0}\right)^{1/(-\gamma)}(1+\tan(\theta_k)^2)^{-1/2}$$ (Eq. 6)

$$y_k = \pm\left(\frac{P_k}{P_0}\right)^{1/(-\gamma)}\left(1+\frac{1}{\tan(\theta_k)^2}\right)^{-1/2};$$ (Eq. 7)

(g) using the angle of arrival (AoA) of each sensed directional sample to resolve the ± ambiguity in (Eq. 6) and (Eq.7) by rewriting (Eq. 6) and (Eq.7) as:

$$x_k = \text{sign}(\cos(\theta_k))\left(\frac{P_k}{P_0}\right)^{1/(-\gamma)}(1+\tan(\theta_k)^2)^{-1/2};$$ (Eq. 8)

$$y_k = \text{sign}(\sin(\theta_k))\left(\frac{P_k}{P_0}\right)^{1/(-\gamma)}\left(1+\frac{1}{\tan(\theta_k)^2}\right)^{-1/2};$$ (Eq. 9)

(h) using (Eq. 4) to rewrite (Eq. 6) and (Eq.7) as:

$$1x + 0y - \text{sign}(\cos(\theta_k))(P_k)^{-\frac{1}{\gamma}}(1+\tan(\theta_k)^2)^{-\frac{1}{2}}\rho = Z_{kx}$$ (Eq. 10)

$$0x + 1y - \text{sign}(\sin(\theta_k))(P_k)^{-\frac{1}{\gamma}}\left(1+\frac{1}{\tan(\theta_k)^2}\right)^{-1/2}\rho = Z_{ky};$$ (Eq. 11)

and (i) estimating the location (x, y) of the source of the SOI with respect to the vector position value (b) of the respective receiving location (K) by expressing (Eq. 10 and Eq. 11) as $$A\begin{pmatrix}x\\y\\\rho\end{pmatrix} = b,$$

where the matrix A's $2K^{th}$ and $(2K+1)^{th}$ rows are given by:

$$\begin{bmatrix}1 & 0 & -\text{sign}(\cos(\theta_k))(P_k)^{-\frac{1}{\gamma}}(1+\tan(\theta_k)^2)^{-\frac{1}{2}}\\0 & 1 & -\text{sign}(\sin(\theta_k))(P_k)^{-\frac{1}{\gamma}}\left(1+\frac{1}{\tan(\theta_k)^2}\right)^{-\frac{1}{2}}\end{bmatrix},$$

and b kth and (k+1)th values are $$\begin{bmatrix}Z_{kx}\\Z_{ky}\end{bmatrix}.$$

2. The method according to claim 1, wherein step (c) further comprises the step of:

(j) using the Moore Penrose pseudo inverse to a MMSE (minimum mean square error) solution of the vector position value (b) of the respective receiving location (K) to solve for (x,y,p)

$$\begin{pmatrix}x\\y\\\rho\end{pmatrix} = (A^*A)^{-1}A^*b.$$

3. The method according to claim 2, further comprising the step of:

(k) computing points for display of a circle-error probability (CEP) ellipse, wherein the points on the ellipse are given by pairs (qx, qy) points for angle beta that meet the relationship:

$$\begin{bmatrix}qx(\beta)\\qy(\beta)\end{bmatrix} = L\begin{bmatrix}\cos(\beta)\\\sin(\beta)\end{bmatrix},$$

wherein orientation and size of semi-major and semi-minor axes for the CEP ellipse being obtained by the decomposition of K in its eigenvectors $V_n$ and eigenvalues $e_n$ to thereby form a diagonal of a matrix E and form the matrix $L = V\sqrt{E}$;

wherein V is defined by measured parameters as:

$$V = \begin{pmatrix}\theta_1\\P_0|Z_1 - S|^{-\gamma}\\\vdots\\\theta_K\\P_0|Z_K - S|^{-\gamma}\end{pmatrix} = V(S, Z),$$

wherein a CRLB Covariance Matrix K is given by $$K = [CD^{-1}C^T]^{-1},$$

with the Matrix C being expressed as:

$$C = \begin{pmatrix}\frac{\partial\theta_1}{\partial x} & \frac{\partial P_1}{\partial x} & \cdots & \frac{\partial\theta_K}{\partial x} & \frac{\partial P_K}{\partial x}\\\frac{\partial\theta_1}{\partial y} & \frac{\partial P_1}{\partial y} & \cdots & \frac{\partial\theta_K}{\partial y} & \frac{\partial P_K}{\partial y}\end{pmatrix},$$

and
with the K×K variance matrix D being expressed as:

$$\mathrm{diag}(D) = (\sigma_{\theta_1}, \sigma_{P_2}, \ldots, \sigma_{\theta_k}).$$

4. A non-transitory computer readable storage medium for use with a computer for estimating the location of the source of a signal of interest (SOI) by processing sensed directional samples of the SOI in combination with a power variable measurement of the SOI,
wherein the computer readable storage medium contains computer executable program instructions for causing the computer to make said estimate in accordance with the following computer processing steps:
wherein:
  i. the location of the source of the SOI is stationary and expressed as S=(x,y);
  ii. the locations at which the directional samples are sensed are defined by a matrix Z with column k expressing the kth receiving location as a pair ($Z_{kx}$, $Z_{ky}$);
  iii. the line of bearing (LoB) in relation to North from the kth receiving location to the source of the SOI is expressed as $\theta_k$;
  iv. the environment is such that there exists a signal-power ($P_K$) relationship between the location of the source of the SOI and the locations at which the directional samples are sensed, with said relationship being expressed by the following equation: $P_k = P_0|Z_k - S|^{-\gamma}$, where Po is the power of the SOI and γ is a signal-path-loss factor for said environment;
  v. the location of the SOI with respect to the locations at which the directional samples are sensed is defined as a pair (xk, yk); and
  vi. rk is defined as the range from the sensor to the SOI; and
wherein the power variable $\rho = (P_0)^{1/\gamma}$;
  (a) preparing a system of equations:

A. $r_k^2 = x_r^2 + y_k^2$ (Eq. 1),

B. $P_k = P_0 |Z_k - S|^{-\gamma} = P_0 r_k^{-\gamma}$ (Eq. 2),

C. $y_k = \tan(\theta_k) x_k$ (Eq. 3); and

D. $\vec{S} = \vec{Z_k} + \vec{r_k}$ (Eq. 4);

(b) using (Eq. 2) to express:

$$r_k^2 = \left(\frac{P_k}{P_0}\right)^{2/(-\gamma)};$$ (Eq. 5)

(c) using (Eq. 5) to rewrite (Eq. 1) as:

$$x_k = \pm \left(\frac{P_k}{P_0}\right)^{1/(-\gamma)} (1 + \tan(\theta_k)^2)^{-1/2}$$ (Eq. 6)

$$y_k = \pm \left(\frac{P_k}{P_0}\right)^{1/(-\gamma)} \left(1 + \frac{1}{\tan(\theta_k)^2}\right)^{-1/2};$$ (Eq. 7)

(d) using the angle of arrival (AoA) of each sensed directional sample to resolve the ± ambiguity in (Eq. 6) and (Eq.7) by rewriting (Eq. 6) and (Eq.7) as:

$$x_k = \mathrm{sign}(\cos(\theta_k)) \left(\frac{P_k}{P_0}\right)^{1/(-\gamma)} (1 - \tan(\theta_k)^2)^{-1/2};$$ (Eq. 8)

$$y_k = \mathrm{sign}(\sin(\theta_k)) \left(\frac{P_k}{P_0}\right)^{1/(-\gamma)} \left(1 + \frac{1}{\tan(\theta_k)^2}\right)^{-1/2};$$ (Eq. 9)

(e) using (Eq. 4) to rewrite (Eq. 6) and (Eq.7) as:

$$1x + 0y - \mathrm{sign}(\cos(\theta_k))(P_k)^{\frac{1}{-\gamma}} (1 + \tan(\theta_k)^2)^{\frac{-1}{2}} \rho = Z_{kx}$$ (Eq. 10)

$$0x + 1y - \mathrm{sign}(\sin(\theta_k))(P_k)^{\frac{1}{-\gamma}} \left(1 + \frac{1}{\tan(\theta_k)^2}\right)^{-1/2} \rho = Z_{ky};$$ (Eq. 11)

and
  (f) estimating the location (x, y) of the source of the SOI with respect to the vector position value (b) of the respective receiving location (K) by expressing (Eq. 10 and Eq. 11) as $$A \begin{pmatrix} x \\ y \\ \rho \end{pmatrix} = b,$$

where the matrix A's $2K^{th}$ and $(2K+1)^{th}$ rows are given by:

$$\begin{bmatrix} 1 & 0 & -\mathrm{sign}(\cos(\theta_k))(P_k)^{\frac{1}{-\gamma}} (1 + \tan(\theta_k)^2)^{-\frac{1}{2}} \\ 0 & 1 & -\mathrm{sign}(\sin(\theta_k))(P_k)^{\frac{1}{-\gamma}} \left(1 + \frac{1}{\tan(\theta_k)^2}\right)^{-\frac{1}{2}} \end{bmatrix},$$ (Eq. 12)

and b kth and (k+1)th values are $\begin{bmatrix} Z_{kx} \\ Z_{ky} \end{bmatrix}$.

5. The non-transitory computer readable storage medium according to claim 4, wherein the computer readable storage medium further contains computer executable program instructions for causing the computer to perform the step of:
  (g) using the Moore Penrose pseudo inverse to a MMSE (minimum mean square error) solution of the vector position value (b) of the respective receiving locations (K) to solve for (x,y,p)

$$\begin{pmatrix} x \\ y \\ \rho \end{pmatrix} = (A^* A)^{-1} A^* b.$$ (Eq. 13)

6. The non-transitory computer readable storage medium according to claim 5, wherein the computer readable storage medium further contains computer executable program instructions for causing the computer to perform the step of:
  (h) computing points for display of a circle-error probability (CEP) ellipse,
  wherein the points on the ellipse are given by pairs (qx, qy) points for angle beta that meet the relationship:

$$\begin{bmatrix} qx(\beta) \\ qy(\beta) \end{bmatrix} = L \begin{bmatrix} \cos(\beta) \\ \sin(\beta) \end{bmatrix},$$

wherein orientation and size of semi-major and semi-minor axes for the CEP ellipse being obtained by the decomposition of K in its eigenvectors $V_n$ and eigenvalues $e_n$ to thereby form a diagonal of a matrix E and form the matrix $L=V\sqrt{E}$;

wherein V is defined by measured parameters as:

$$V = \begin{pmatrix} \theta_1 \\ P_0|Z_1 - S|^{-\gamma} \\ \vdots \\ \theta_K \\ P_0|Z_K - S|^{-\gamma} \end{pmatrix} = V(S, Z),$$

wherein a CRLB Covariance Matrix K is given by $$K=[CD^{-1}C^T]^{-1},$$

with the Matrix C being expressed as:

$$C = \begin{pmatrix} \frac{\partial \theta_1}{\partial x} & \frac{\partial P_1}{\partial x} & \cdots & \frac{\partial \theta_K}{\partial x} & \frac{\partial P_K}{\partial x} \\ \frac{\partial \theta_1}{\partial y} & \frac{\partial P_1}{\partial y} & \cdots & \frac{\partial \theta_K}{\partial y} & \frac{\partial P_K}{\partial y} \end{pmatrix},$$

and with the K×K variance matrix D being expressed as:

$$\text{diag}(D)=(\sigma_{\theta_1},\sigma_{P_2},\ldots,\sigma_{\theta_K},\sigma_{P_K}).$$

* * * * *

UNITED STATES PATENT AND TRADEMARK OFFICE
CERTIFICATE OF CORRECTION

PATENT NO. : 10,215,835 B1
APPLICATION NO. : 14/836088
DATED : February 26, 2019
INVENTOR(S) : Marc Pierre Olivieri Page 1 of 1

It is certified that error appears in the above-identified patent and that said Letters Patent is hereby corrected as shown below:

In the Specification

At Column 1, Line 66, "σ" should be --ρ--
At Column 2, Line 12, "σ" should be --ρ--
At Column 2, Line 18, "σ" should be --ρ--
At Column 2, Line 19, "σ" should be --ρ--
At Column 2, Line 62, in equation 1, "xr2" should be --xk2--
At Column 4, Line 22, "σ" should be --ρ--
At Column 4, Line 67, "σP2" should be --σP1--
At Column 6, Line 14, "σ" should be --ρ--

In the Claims

At Column 7, Line 12, in equation 1, "xr2" should be --xk2--
At Column 9, Line 4, "σP2" should be --σP1--
At Column 9, Line 4, --,σPK-- should be inserted between "σΘK" and the closed parenthesis ")"
At Column 9, Line 40, in equation 1, "xr2" should be --xk2--
At Column 10, Line 2, in equation 8, "(1 - tan(Θk)2)-1/2" should be --(1 + tan(Θk)2)-1/2--
At Column 11, Line 30, "σP2" should be --σP1--

Signed and Sealed this
Sixteenth Day of July, 2019

Andrei Iancu
*Director of the United States Patent and Trademark Office*